United States Patent
Epstein et al.

(10) Patent No.: US 10,549,845 B2
(45) Date of Patent: Feb. 4, 2020

(54) DEDICATED FANS FOR BOUNDARY LAYER INGESTION

(71) Applicant: UNITED TECHNOLOGIES CORPORATION, Farmington, CT (US)

(72) Inventors: Alan H. Epstein, Lexington, MA (US); Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 300 days.

(21) Appl. No.: 15/606,051

(22) Filed: May 26, 2017

(65) Prior Publication Data

US 2018/0339765 A1    Nov. 29, 2018

(51) Int. Cl.
*B64C 21/06* (2006.01)
*B64C 23/02* (2006.01)
*B64C 1/00* (2006.01)
*B64D 33/02* (2006.01)

(52) U.S. Cl.
CPC ............ *B64C 21/06* (2013.01); *B64C 23/02* (2013.01); *B64C 1/0009* (2013.01); *B64D 2033/0226* (2013.01)

(58) Field of Classification Search
CPC ............ B64D 2033/0226; B64D 27/14; B64D 27/08; B64D 27/20
See application file for complete search history.

(56) References Cited

U.S. PATENT DOCUMENTS

| | | | | |
|---|---|---|---|---|
| 3,109,614 A | * | 11/1963 | Steidl | B64C 9/00 244/48 |
| 3,286,470 A | * | 11/1966 | Gerlaugh | B64D 27/20 60/229 |
| 3,576,300 A | | 4/1971 | Palfreyman | |
| 5,236,155 A | * | 8/1993 | Hrach | B64C 21/025 244/130 |
| 5,529,263 A | * | 6/1996 | Rudolph | B64C 30/00 244/15 |
| 6,575,406 B2 | * | 6/2003 | Nelson | B64C 1/0009 244/119 |

(Continued)

FOREIGN PATENT DOCUMENTS

| | | | | |
|---|---|---|---|---|
| EP | 2581308 | | 4/2013 | |
| FR | 2915460 A1 | * | 10/2008 | ............... B64C 1/22 |
| GB | 735065 A | * | 8/1955 | ............. B64C 21/06 |

OTHER PUBLICATIONS

Extended European Search Report for EP Application No. 18174158.8, dated Jul. 17, 2018.

*Primary Examiner* — Magdalena Topolski
(74) *Attorney, Agent, or Firm* — Carlson, Gaskey & Olds, P.C.

(57) ABSTRACT

A propulsion system for an aircraft including at least two main gas turbine engines and a plurality of dedicated boundary layer ingestion fans. The propulsion system is arranged such that a combined thrust produced by the boundary layer ingestion fans is less than 20 percent of a total thrust of the main engines and the boundary layer ingestion fans. The boundary layer ingestion fans are controllable and selectively turned off at lower speeds.

20 Claims, 2 Drawing Sheets

(56) References Cited

U.S. PATENT DOCUMENTS

| | | | |
|---|---|---|---|
| 8,398,022 B2* | 3/2013 | Cazals | B64D 27/20 |
| | | | 244/119 |
| 9,376,213 B2 | 6/2016 | Rolt | |
| 9,909,530 B2* | 3/2018 | Tillman | B64D 29/04 |
| 10,099,793 B2* | 10/2018 | Ullman | B64D 27/24 |
| 2007/0241229 A1* | 10/2007 | Silkey | B64D 33/02 |
| | | | 244/53 A |
| 2008/0121756 A1 | 5/2008 | McComb | |
| 2014/0252161 A1* | 9/2014 | Gukeisen | B64D 27/14 |
| | | | 244/60 |
| 2016/0332741 A1 | 11/2016 | Moxon | |
| 2017/0081035 A1 | 3/2017 | Becker et al. | |
| 2017/0081037 A1 | 3/2017 | Marrinan et al. | |
| 2017/0096232 A1* | 4/2017 | Suciu | B64D 27/14 |
| 2018/0298829 A1* | 10/2018 | Lord | F02C 9/18 |

* cited by examiner

DEDICATED FANS FOR BOUNDARY LAYER INGESTION

STATEMENT REGARDING FEDERALLY SPONSORED RESEARCH OR DEVELOPMENT

This invention was made with government support under Contract No. NND15AC56C, awarded by NASA. The Government has certain rights in this invention.

BACKGROUND OF THE INVENTION

This application relates to a propulsion system for an aircraft wherein there are main gas turbine engines and smaller boundary layer ingestion fans.

Gas turbine engines are known and typically include a fan delivering air into a bypass duct as propulsion air and also delivering air into a compressor. The air is compressed in the compressor and delivered into a combustor where it is mixed with fuel and ignited. Products of this combustion pass downstream over turbine rotors driving them to rotate.

The location of gas turbine engines has been relatively static with traditional aircraft fuselage designs. However, a proposed fuselage has a relatively wide body.

With any fuselage, there will be boundary layer that develops across all outer surfaces of the fuselage. It would be desirable to remove the boundary layer air to reduce drag.

Thus, proposed propulsion systems for such an aircraft have generally suggested positioning main gas turbine engines above the fuselage to ingest the boundary layer air.

SUMMARY OF THE INVENTION

In a featured embodiment, a propulsion system for an aircraft has at least two main gas turbine engines and a plurality of dedicated boundary layer ingestion fans.

In another embodiment according to the previous embodiment, a total thrust provided by a combination of the at least two main gas turbine engines and the dedicated boundary layer ingestion fans is such that a combination of a thrust provided by the dedicated plurality of boundary layer ingestion fans is less than 10 percent of the total thrust.

In another embodiment according to any of the previous embodiments, there are more than five of the dedicated boundary layer ingestion fans.

In another embodiment according to any of the previous embodiments, a diameter of the dedicated boundary layer ingestion fans may be less than 15 inches and a fan pressure ratio at cruise condition may be less than 1.5.

In another embodiment according to any of the previous embodiments, a control for the dedicated boundary layer ingestion fans selectively turns the boundary layer ingestion fans off at lower aircraft speeds.

In another embodiment according to any of the previous embodiments, the lower aircraft speeds include takeoff.

In another embodiment according to any of the previous embodiments, a control selectively turns the dedicated boundary layer ingestion fans off at lower aircraft speeds.

In another embodiment according to any of the previous embodiments, the lower aircraft speeds include takeoff of an associated aircraft.

In another embodiment according to any of the previous embodiments, a control selectively turns the dedicated boundary layer ingestion fans off at lower aircraft speeds.

In another embodiment according to any of the previous embodiments, a curved surface provides an inlet to the dedicated boundary layer ingestion fans.

In another featured embodiment, an aircraft has a wide fuselage and a tail section, with a plurality of main gas turbine engines mounted at a location outside the wide fuselage. A plurality of dedicated boundary layer ingestion fans are mounted in the tail section of the aircraft to ingest boundary layer air created by the wide fuselage In another embodiment according to the previous embodiment, a total thrust provided by a combination of the at least two main gas turbine engines and the dedicated boundary layer ingestion fans is such that a combination of a thrust provided by the plurality of dedicated boundary layer ingestion fans is less than 10 percent of the total thrust.

In another embodiment according to any of the previous embodiments, there are more than five of the dedicated boundary layer ingestion fans.

In another embodiment according to any of the previous embodiments, a diameter of the dedicated boundary layer ingestion fans may be less than 15 inches and a fan pressure ratio at cruise condition may be less than 1.5.

In another embodiment according to any of the previous embodiments, a control selectively turns the dedicated boundary layer ingestion fans off at lower aircraft speeds.

In another embodiment according to any of the previous embodiments, the lower aircraft speeds include takeoff.

In another embodiment according to any of the previous embodiments, a control selectively turns the dedicated boundary layer ingestion fans off at lower aircraft speeds.

In another embodiment according to any of the previous embodiments, the lower aircraft speeds include takeoff.

In another embodiment according to any of the previous embodiments, the wide fuselage is defined as having a height and a width with the width being greater than one and a half times the height.

In another embodiment according to any of the previous embodiments, a curved surface on the fuselage provides an inlet to the dedicated boundary layer ingestion fans.

These and other features may be best understood from the following drawings and specification.

DETAILED DESCRIPTION

Figure 1:
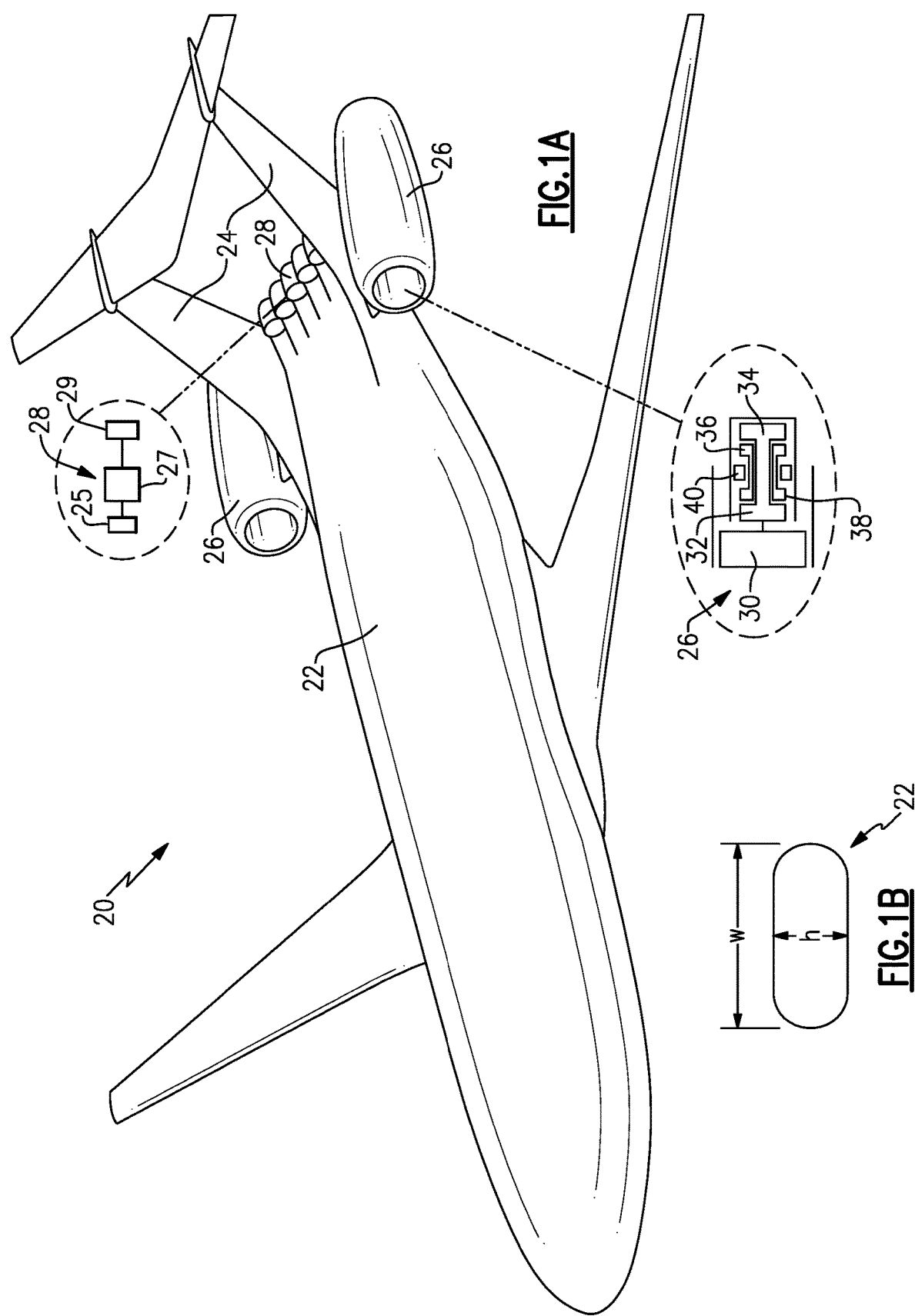
FIG. 1A shows an aircraft.
FIG. 1B shows a detail of the FIG. 1A aircraft.

FIG. 1A shows an aircraft 20 having a wide fuselage 22. As shown, a tail section 24 is provided. Gas turbine engines 26 are positioned outwardly of the tail section. It should be understood that this is not the only location for the main gas turbine engines 26 and they could be mounted in other locations, such as under the wings of the aircraft 20.

As shown in a callout, the main gas turbine engines 26 include an engine fan 30 delivering air into a bypass duct and into a low pressure compressor 32 which is driven by a low pressure turbine 34. Downstream of the low pressure compressor 32 is a high pressure compressor 38. The high pressure compressor 38 is driven by a high pressure turbine 36. Air from the compressor 38 is delivered into a combustor 40, where it is ignited as known.

To remove the boundary layer air from atop the fuselage 22, a plurality of dedicated boundary layer ingestion fans 28 are positioned in the tail section 24. As shown in the callout, the dedicated boundary layer ingestion fans 28 may include a control 25 for a motor 27 driving a dedicated fan rotor 29, all shown schematically. That is, the fans 28 are driven by a motor 27 independent of the engines 26. In one embodiment, there are seven boundary layer ingestion fans 28 positioned adjacent the tail section 24.

In embodiments, the thrust provided by all of the dedicated boundary layer ingestion fans 28 combined is less than 20 percent, and in other embodiments less than 10 percent, of the overall thrust provided by the propulsion system including the dedicated boundary layer ingestion fans 28 and the main gas turbine engines 26.

FIG. 1B shows a detail of the fuselage 22. A height h is defined and a width W is defined between opposed sides of the fuselage 22. In embodiments, the width W is more than one and a half times the height h.

Figure 2:
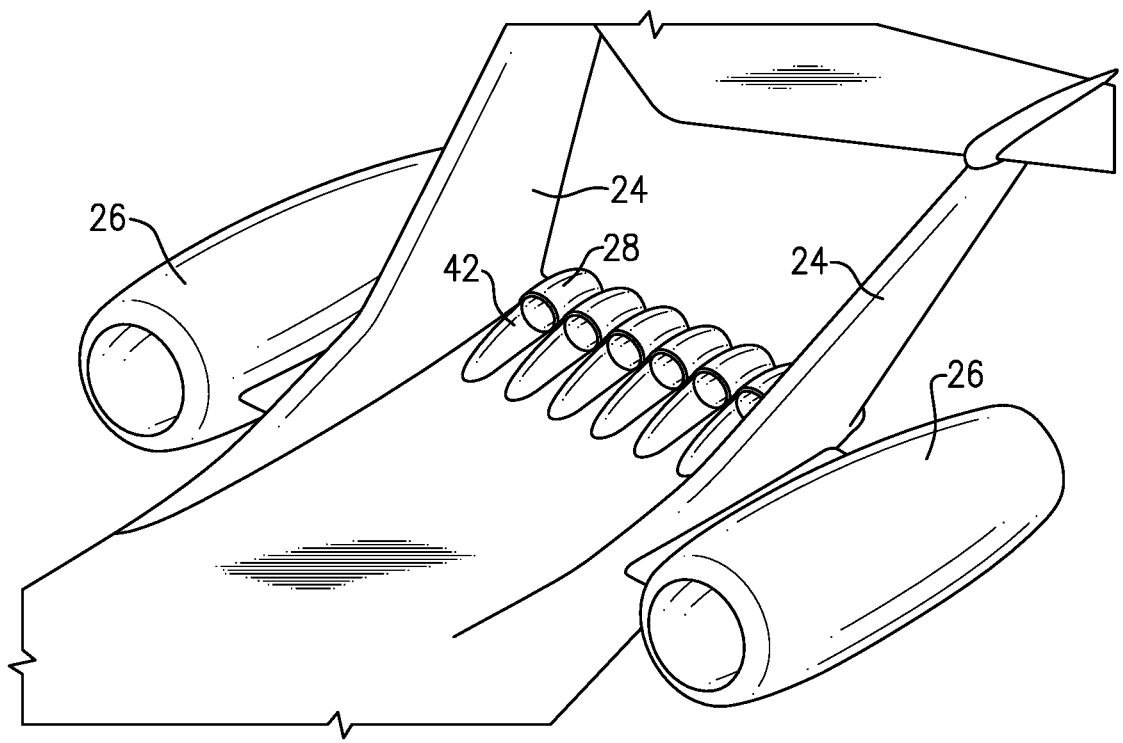
FIG. 2 shows a detail of a propulsion system.

FIG. 2 shows a detail including a scoop inlet 42 leading into the dedicated boundary layer ingestion fans 28. As can be seen, the scoop inlet includes a curved surface moving into an inlet for the boundary layer ingestion fans 28 (See FIG. 1A).

Figure 3:
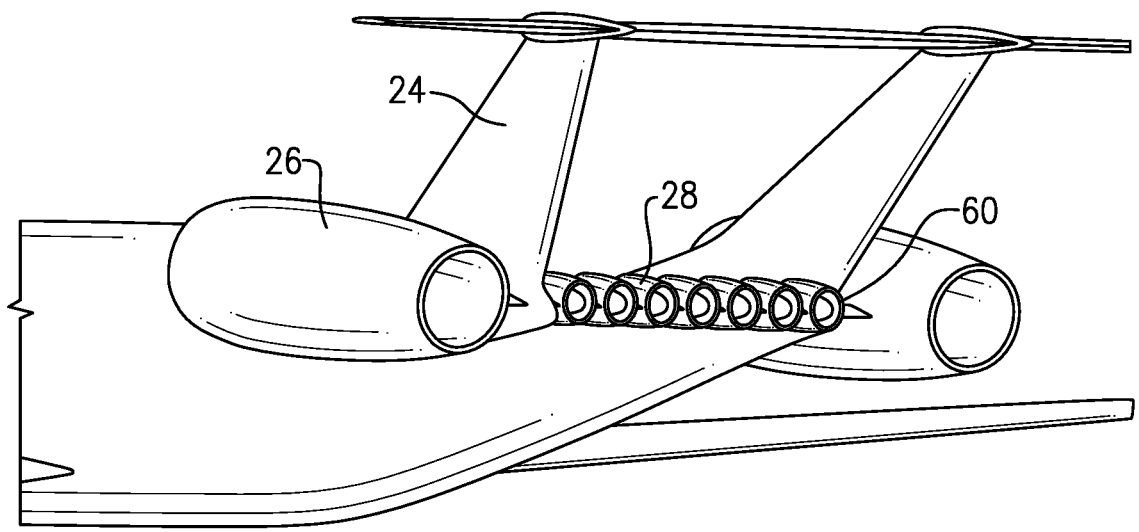
FIG. 3 shows a rear view of the FIG. 2 propulsion system.

FIG. 3 is a rear view showing the dedicated boundary layer ingestion fans 28 having an exhaust 60 rearward of the aircraft.

In embodiments, it may be desirable to substitute a gear connection between a gas turbine engine 26 to drive the dedicated fan rotors 29, rather than the dedicated motor 27. In other embodiments, the motor 27 is utilized and may be an electric motor or a gas turbine engine (power turbine).

The boundary layer air is less problematic at low aircraft speeds. As such, in order to increase efficiency, the dedicated boundary layer ingestion fans 28 may be turned off during takeoff, but utilized at higher speed operation, such as cruise or climb conditions.

In embodiments, the dedicated boundary layer ingestion fan rotors 28 may have a diameter of less than 15 inches and may be approximately 10 inches. Each dedicated boundary layer ingestion fan may provide propulsion of less than 50 lbf of thrust and may be approximately 34 lbf. Also, the fans may operate at a fan pressure ratio of less than 1.5 and in one embodiment approximately 1.25 at cruise condition.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A propulsion system for an aircraft comprising:
at least two main gas turbine engines and a plurality of dedicated boundary layer ingestion fans;
wherein a total thrust provided by a combination of said at least two main gas turbine engines and said dedicated boundary layer ingestion fans is such that a combination of a thrust provided by said dedicated plurality of boundary layer ingestion fans is less than 20 percent of said total thrust;
wherein a control selectively turns said dedicated boundary layer ingestion fans off at lower aircraft speeds; and
said dedicated boundary layer ingestion fans are driven by a motor, said motor controlled by said control, and said motor being separate from said at least two main gas turbine engines.

2. The propulsion system as set forth in claim 1, wherein said total thrust provided by said combination of said at least two main gas turbine engines and said dedicated boundary layer ingestion fans is such that said combination of thrust provided by said dedicated plurality of boundary layer ingestion fans is less than 10 percent of said total thrust.

3. The propulsion system as set forth in claim 2, wherein there are more than five of said dedicated boundary layer ingestion fans.

4. The propulsion system as set forth in claim 3, wherein a diameter of said dedicated boundary layer ingestion fans is less than 15 inches and a fan pressure ratio at cruise condition is less than 1.5.

5. The propulsion system as set forth in claim 1, wherein said lower aircraft speeds include takeoff of an associated aircraft.

6. The propulsion system as set forth in claim 1, wherein a curved surface provides an inlet to said dedicated boundary layer ingestion fans.

7. The aircraft as set forth in claim 6, wherein said total thrust provided by a combination of said at least two main gas turbine engines and said dedicated boundary layer ingestion fans is such that said combination of said thrust provided by said plurality of dedicated boundary layer ingestion fans is less than 10 percent of said total thrust.

8. An aircraft comprising:
a wide fuselage and having a tail section, with a plurality of main gas turbine engines mounted at a location outside said wide fuselage; and
a plurality of dedicated boundary layer ingestion fans mounted in said tail section of said aircraft to ingest boundary layer air created by said wide fuselage; and
wherein a total thrust provided by a combination of said at least two main gas turbine engines and said dedicated boundary layer ingestion fans is such that a combination of a thrust provided by said plurality of dedicated boundary layer ingestion fans is less than 20 percent of said total thrust.

9. The aircraft as set forth in claim 8, wherein there are more than five of said dedicated boundary layer ingestion fans.

10. The aircraft as set forth in claim 9, wherein a diameter of said dedicated boundary layer ingestion fans is less than 15 inches and a fan pressure ratio at cruise condition is less than 1.5.

11. The aircraft as set forth in claim 9, wherein a control selectively turns said dedicated boundary layer ingestion fans off at lower aircraft speeds.

12. The aircraft as set forth in claim 11, wherein said lower aircraft speeds include takeoff.

13. The aircraft as set forth in claim 11, said dedicated boundary layer and ingestion fans are driven by a motor, said motor controlled by said control, and said motor being separate from said at least two main gas turbine engines.

14. The aircraft as set forth in claim 8, wherein a control selectively turns said dedicated boundary layer ingestion fans off at lower aircraft speeds.

15. The aircraft as set forth in claim 14, wherein said lower aircraft speeds include takeoff.

16. The aircraft as set forth in claim 14, said dedicated boundary layer and ingestion fans are driven by a motor, said motor controlled by said control, and said motor being separate from said at least two main gas turbine engines.

17. The aircraft as set forth in claim 8, wherein said wide fuselage is defined as having a height and a width with said width being greater than one and a half times said height.

18. The aircraft as set forth in claim 17, wherein a curved surface on said fuselage provides an inlet to said dedicated boundary layer ingestion fans.

19. The aircraft as set forth in claim 8, wherein said main gas turbine engine each have a fan independent of said boundary layer ingestion fans.

20. The propulsion system as set forth in claim 8, wherein said main gas turbine engine each have a fan independent of said boundary layer ingestion fans.

\* \* \* \* \*